United States Patent
Hanson

(10) Patent No.: US 9,233,584 B2
(45) Date of Patent: Jan. 12, 2016

(54) TIRE CHAIN AND METHOD OF MODIFYING A TIRE CHAIN

(76) Inventor: J. Scott Hanson, Oregon City, OR (US)

(\*) Notice: Subject to any disclaimer, the term of this patent is extended or adjusted under 35 U.S.C. 154(b) by 213 days.

(21) Appl. No.: 13/209,308

(22) Filed: Aug. 12, 2011

(65) Prior Publication Data

US 2012/0132329 A1 May 31, 2012

Related U.S. Application Data

(60) Provisional application No. 61/374,173, filed on Aug. 16, 2010.

(51) Int. Cl.
*B60C 27/06* (2006.01)
*B60C 27/08* (2006.01)

(52) U.S. Cl.
CPC .............. *B60C 27/066* (2013.04); *B60C 27/08* (2013.01); *Y10T 29/49947* (2015.01); *Y10T 152/10279* (2015.01)

(58) Field of Classification Search
CPC ...... B60C 27/00; B60C 27/06; B60C 27/062; B60C 27/066; B60C 27/068; B60C 27/08
USPC ............. 152/208, 213 R, 221, 222, 223, 231, 152/232, 233
See application file for complete search history.

(56) References Cited

U.S. PATENT DOCUMENTS

| | | | |
|---|---|---|---|
| 1,486,993 A | 3/1924 | Stolpe | |
| 2,207,971 A * | 7/1940 | Chaussee | 152/213 R |
| 2,950,750 A * | 8/1960 | St Pierre | 152/231 |
| 4,066,112 A | 1/1978 | Goldstein | |
| 4,243,088 A * | 1/1981 | Labonville | 152/223 |
| 4,366,850 A * | 1/1983 | Coutts | 152/222 |
| 5,056,574 A | 10/1991 | Maresh et al. | |
| 5,082,039 A | 1/1992 | Franklin | |
| 5,236,025 A | 8/1993 | Maresh | |
| 5,299,613 A | 4/1994 | Maresh | |
| 6,035,912 A | 3/2000 | Clark | |
| 6,085,816 A | 7/2000 | Clark | |
| 6,092,577 A | 7/2000 | Franklin | |
| 6,591,882 B1 | 7/2003 | Clark | |
| 6,725,894 B2 | 4/2004 | Clark | |
| 7,021,347 B2 | 4/2006 | Chang | |
| 7,080,674 B2 | 7/2006 | Clark | |
| 7,204,282 B2 * | 4/2007 | Scott et al. | 152/242 |
| 7,380,394 B2 | 6/2008 | Preusker | |
| 7,451,793 B2 | 11/2008 | Marco et al. | |
| 7,472,731 B2 | 1/2009 | Arrigoni Neri et al. | |
| 7,578,326 B2 | 8/2009 | Preusker | |
| 2007/0089823 A1 | 4/2007 | Pengg | |
| 2009/0095393 A1 | 4/2009 | Davis et al. | |
| 2009/0294004 A1 | 12/2009 | Stewart | |

\* cited by examiner

*Primary Examiner* — Jason S Daniels
(74) *Attorney, Agent, or Firm* — Chernoff, Vilhauer, McClung & Stenzel, LLP

(57) ABSTRACT

A tire chain includes a side member. An attachment bracket is secured at a first end region to the side member. The attachment bracket is formed at a second end region with a slot and with a channel. A crosslink member has an endless link at one end. The endless link defines an opening and is located in the slot so that the opening intersects the channel. A rod extends through the channel and the opening of the endless link and is secured against removal from the channel, whereby the crosslink member is secured to the attachment bracket.

6 Claims, 3 Drawing Sheets

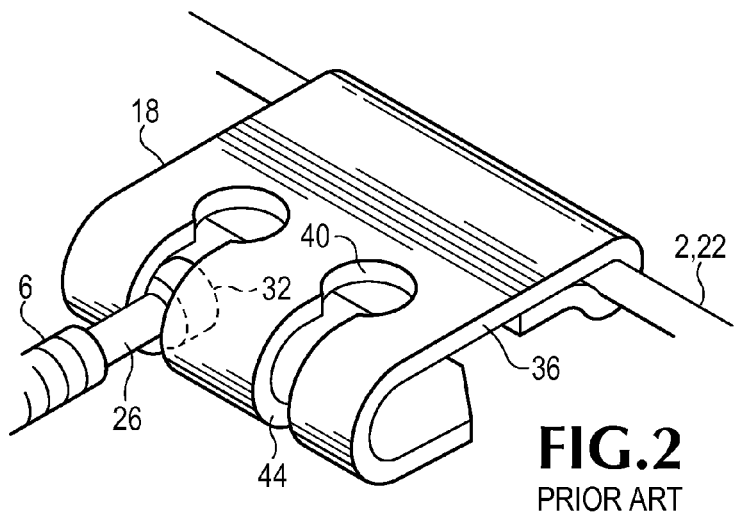
FIG.2
PRIOR ART
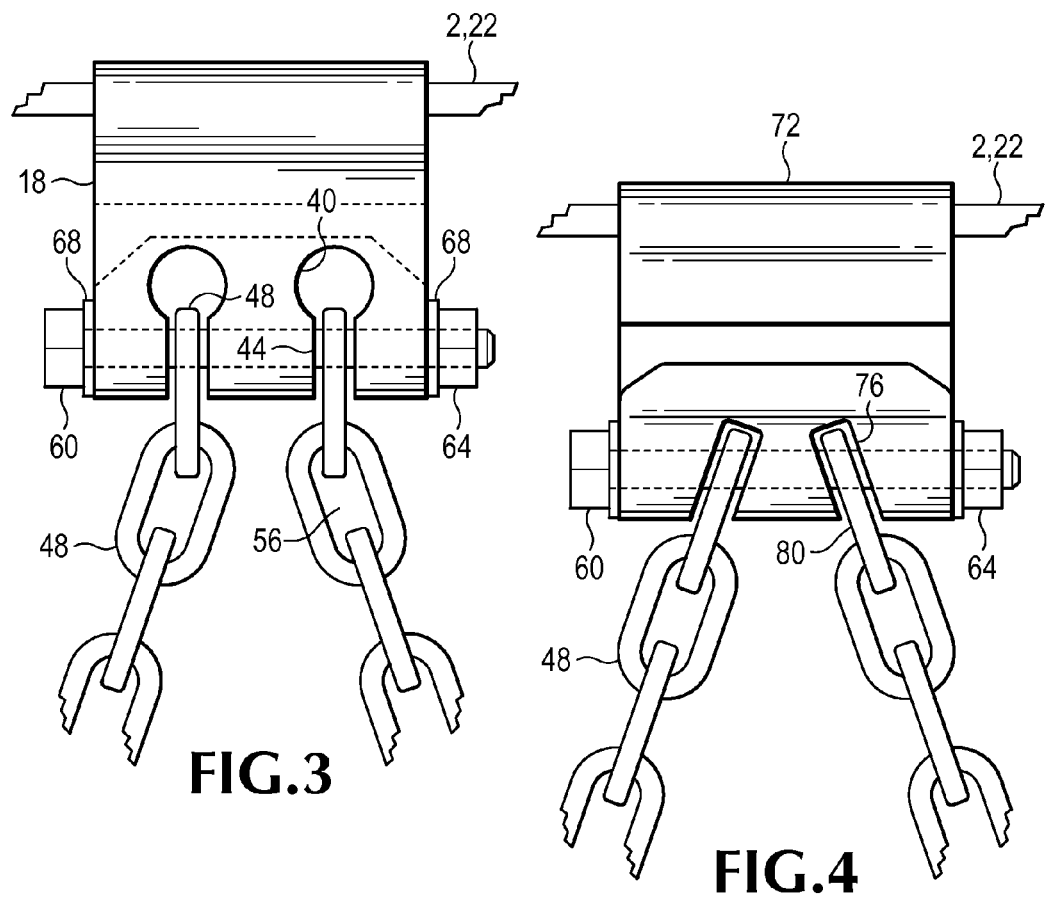
FIG.3
FIG.4

TIRE CHAIN AND METHOD OF MODIFYING A TIRE CHAIN

CROSS-REFERENCE TO RELATED APPLICATION

This application claims benefit of U.S. Provisional Application No. 61/374,173 filed Aug. 16, 2010, the entire disclosure of which is hereby incorporated herein by reference for all purposes.

BACKGROUND OF THE INVENTION

The subject matter of this application is a tire chain and a method of modifying a tire chain.

Referring to FIGS. 1 and 2 of the drawings, one known type of tire chain comprises an elongated inner side member 2 adapted to form a circle of predetermined circumference about a rim of a vehicle wheel at the inner side thereof and having cooperable fastener elements (not shown) at opposite ends thereof which are joined to complete the circle. Crosslinks 6 form a zigzag pattern including a plurality of spaced inner vertices 10 along one edge of the pattern adjacent to the inner side member and a plurality of spaced outer vertices 14 along an opposite edge of the pattern remote from the inner side member and adapted to be positioned adjacent to the rim at the outer side thereof, with the crosslinks 6 extending back and forth across the tread of a tire mounted on the rim. The inner vertices are attached to the inner side member at predetermined positions by attachment brackets 18 spaced apart along the inner side member and attached both to the inner side member and to the inner ends of the crosslinks that meet at a given vertex. The opposite, outer, end of each crosslink meets the outer end of an adjacent crosslink at an outer vertex 14 and the two outer ends, of the adjacent crosslinks respectively, are attached to an attachment bracket 18 which is attached to an elongated outer side member 22 forming part of a tensioning device for drawing the outer vertices toward the rotational axis of the wheel.

In a practical implementation of the conventional tire chain, each crosslink 6 comprises a length of flexible cable threaded through generally cylindrical traction elements and provided at each end with a crimped lug or bushing. The attachment bracket 18 comprises a metal plate that is bent in a generally C-shaped configuration and thus comprises a substantially flat part 36 intermediate two opposite curved parts. One of the two curved parts is fitted around the elongated inner or outer member 2, 22 of the tire chain and is crimped in position so as to grip the inner or outer member firmly. The other curved part of the plate is formed with two keyhole openings each having a larger, circular portion 40 and a narrower slot portion 44 extending from the circular portion 40. The circular portion of the keyhole opening is situated in the flat part of the plate and the slot portion extends partially around the curved part of the plate. The crosslink is attached to the attachment bracket by inserting the lug 32 through the circular portion 40 of the keyhole opening and then positioning the lug so that the cable 26 is located in and extends through the slot form portion 44 of the opening, whereby the lug is located interiorly of the curved part of the plate.

This type of tire chain allows replacement of the crosslinks in the event of damage, but handling of the tire chain is difficult and arduous because the crosslinks are quite heavy. Further, it has been found that in some cases the traction elements are somewhat lacking in endurance.

SUMMARY OF THE INVENTION

In accordance with a first aspect the subject matter of this application provides a method of modifying a tire chain that comprises a side member and an attachment bracket for releasably securing a cable crosslink member, including a length of flexible stranded cable and a lug secured to the length of flexible cable at one end thereof, to the side member, wherein the attachment bracket has a first end region at which it is secured to the side member and also has an opposite second end region, and at the second end region, the attachment bracket is formed with a slot and with a channel for receiving the lug of the cable crosslink member with the cable extending through the slot to secure the cable crosslink member detachably to the attachment bracket, the method comprising providing a second crosslink member having an endless link at one end thereof, the endless link defining an opening, inserting the endless link of the second crosslink member into the slot so that the opening intersects the channel, inserting a rod through the channel and the opening of the endless link, and securing the rod against removal from the channel, whereby the second crosslink member is secured to the attachment bracket.

In accordance with a second aspect the subject matter of this application provides a method of modifying a tire chain that comprises a side member, a first crosslink member, and an attachment bracket for releasably securing the first crosslink member to the side member, wherein the first crosslink member is a cable crosslink member that includes a length of flexible stranded cable and a lug secured to the length of flexible cable at one end thereof, the attachment bracket has a first end region at which it is secured to the side member and also has an opposite second end region, and at the second end region, the attachment bracket is formed with a slot and with a channel that receives the lug of the first crosslink member with the cable extending through the slot to secure the first crosslink member detachably to the attachment bracket, the method comprising detaching the first crosslink member from the attachment bracket, providing a second crosslink member having an endless link at one end thereof, the endless link defining an opening, inserting the endless link of the second crosslink member into the slot so that the opening intersects the channel, inserting a rod through the channel and the opening of the endless link, and securing the rod against removal from the channel, whereby the second crosslink member is secured to the attachment bracket.

In accordance with a third aspect the subject matter of this application provides a tire chain comprising a side member, an attachment bracket having a first end region at which it is secured to the side member and also having an opposite second end region, the attachment bracket being formed at the second end region with a slot and with a channel, a crosslink member having an endless link at one end thereof, the endless link defining an opening, the endless link being located in the slot so that the opening intersects the channel, and a rod extending through the channel and the opening of the endless link and secured against removal from the channel, whereby the crosslink member is secured to the attachment bracket.

BRIEF DESCRIPTION OF THE DRAWINGS

For a better understanding of the invention, and to show how the same may be carried into effect, reference will now be made, by way of example, to the accompanying drawings, in which:

FIG. 2 is an enlarged perspective view of an attachment bracket that forms part of the conventional tire chain.

FIG. 3 is an enlarged perspective view of a part of a tire chain embodying the subject matter of this patent application, FIG. 4 is a similar view of a first modification of the tire chain shown in FIG. 3, and FIGS. 5 and 6 are enlarged perspective views of a second modification of the tire chain shown in FIG. 3, in different respective orientations.

DETAILED DESCRIPTION

Figure 1:
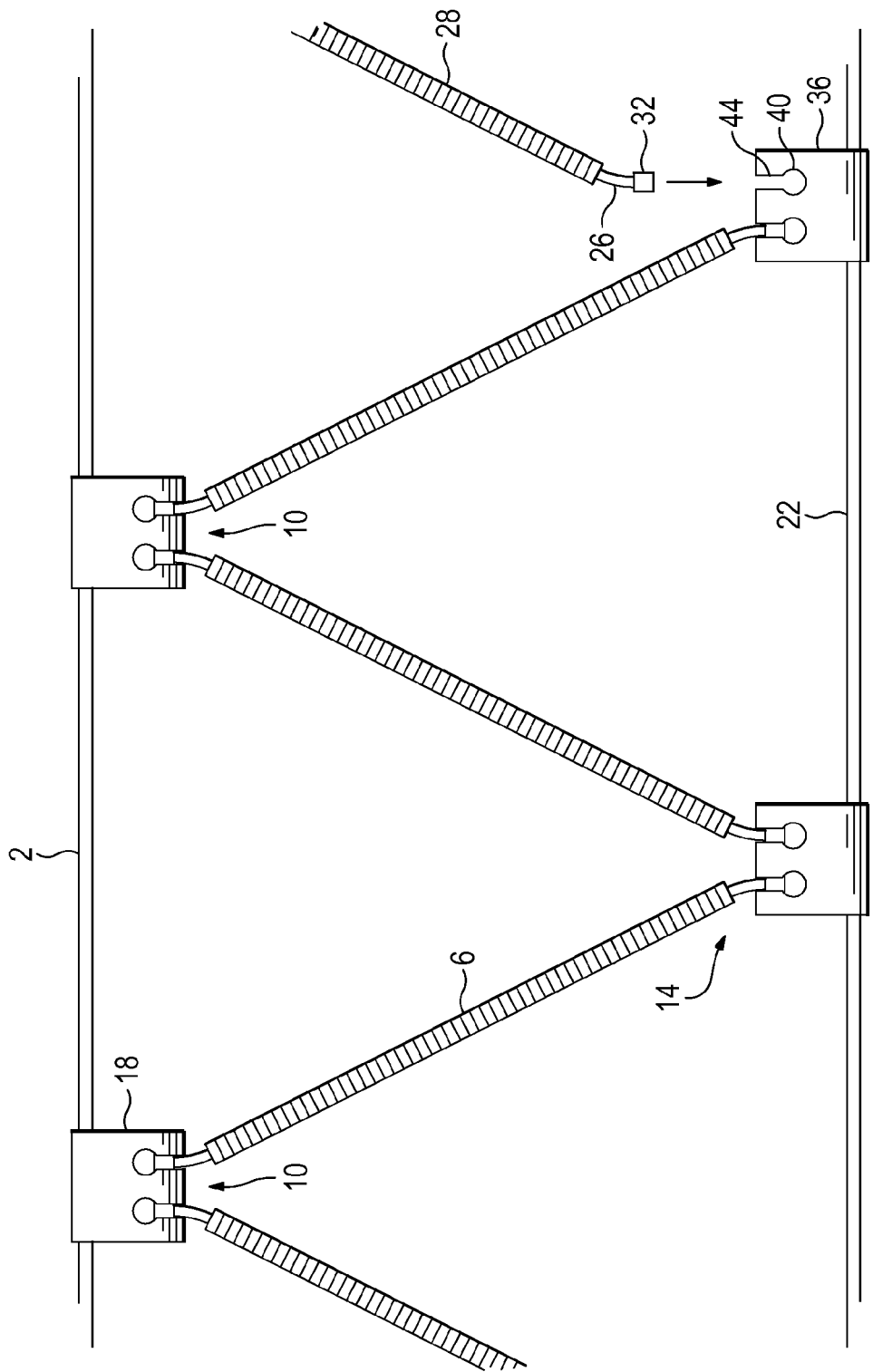
FIG. 1 is a partial plan view of a conventional tire chain.

FIG. 3 illustrates a modification of the tire chain shown in FIGS. 1 and 2 of the drawings. The modified tire chain that is shown partially in FIG. 3 comprises an inner side member 2, a tensioning device including an outer side member 22, inner and outer attachment brackets 18 secured to the inner side member and the outer side member respectively, and multiple crosslinks 48 each having one end secured to an inner attachment bracket and an opposite end secured to an outer attachment bracket. The attachment brackets 18 are essentially the same as the attachment brackets shown in FIGS. 1 and 2. The crosslinks 48 are composed of lengths of link chain and therefore are simpler in structure than the crosslinks shown in FIGS. 1 and 2.

The links 52 of the link chain are small enough that an end of a link can fit loosely in the slot portion 44 of the keyhole opening in an attachment bracket 18 and the opening 56 defined by the link then intersects the channel defined by the bracket, in the sense that there are points within the opening that are also within the channel.

In order to secure two crosslinks to an attachment bracket 18 of the tire chain shown in FIG. 3, to form part of a zigzag crosslink pattern, one end link of each of the two crosslinks is inserted into the slot portions 44 of respective openings of the attachment bracket, so that the openings defined by the end links respectively intersect the channel defined by the bracket. A bolt 60 is inserted through the channel and the openings of the two end links respectively and a nut 64 is applied to the bolt. Washers 68 prevent the nut and the head of the bolt entering the channel. In this manner, the bolt is retained in position relative to the bracket and the ends of the crosslinks are captive relative to the bracket, yet with an appropriate tool the nut can be readily removed from the bolt, allowing removal of the bolt from the channel and detachment of the crosslinks from the attachment bracket. It is preferred that the nut be a nylon lock nut, since vibration may otherwise result in the nut inadvertently becoming detached from the bolt in use.

As shown in FIG. 2, in the case of the conventional attachment bracket the free end of the curved part that is formed with the keyhole opening is generally parallel with the flat part 36 of the attachment bracket. Thus, were it not for the links of the crosslinks, a bolt placed in the channel would not be positively retained in the channel. However, it will be appreciated that in the case of the tire chain shown in FIG. 3, interference between the crosslinks and the attachment bracket serves to retain the bolt in the channel.

Use of link chain crosslinks instead of cable crosslinks may be advantageous because the link chain crosslinks may be more durable than the cable crosslinks, thereby requiring less frequent repair, and the link chain crosslinks may be lighter in weight than the cable crosslinks so that any necessary repair work is easier. Further, link chain crosslinks are generally considered to provide better traction than many conventional cable crosslinks.

It will be appreciated that a tire chain may be initially assembled using link chain crosslinks instead of cable crosslinks by securing the crosslinks to the attachment brackets in the manner described above prior to first mounting of the tire chain to a tire. Alternatively, an existing tire chain including cable crosslinks may be retrofitted with link chain crosslinks by detaching the cable crosslinks from the attachment brackets and securing link chain crosslinks to the attachment brackets in their place.

Figure 5:
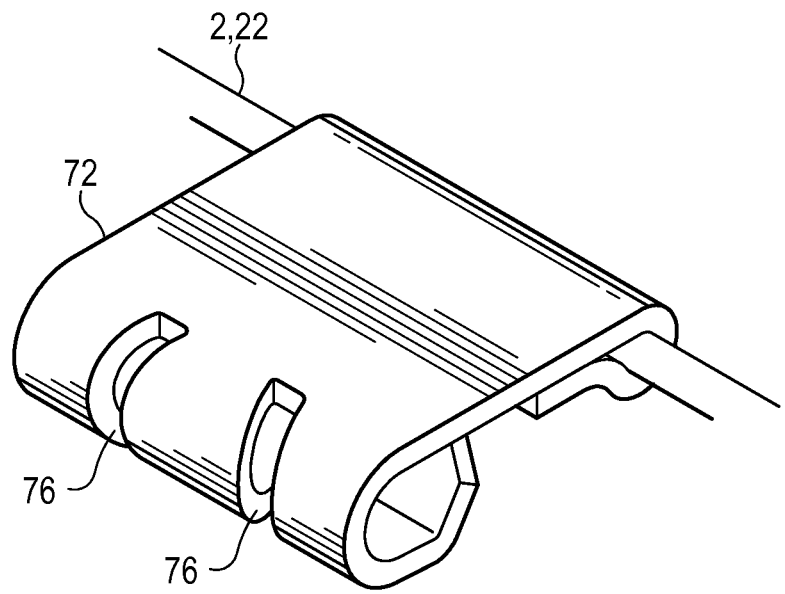
Figure 6:
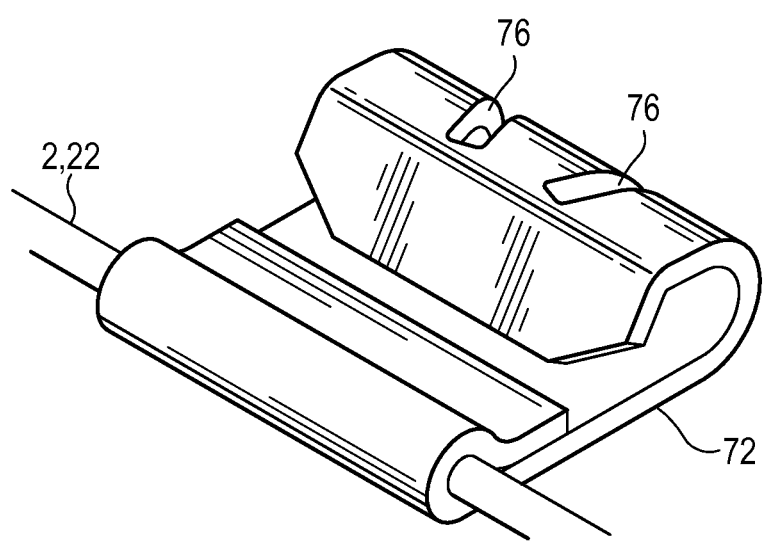

As mentioned above, the attachment bracket 18 shown in FIG. 3 is essentially the same as those shown in FIGS. 1 and 2 since they are designed to receive cable crosslinks. In a further development, shown partially in FIG. 4-6, the attachment brackets 72 are especially designed to receive link chain crosslinks 48. As shown in FIG. 4, the openings 76 in the attachment bracket 72 are uniform width slots, instead of being keyhole openings, and are inclined to the longitudinal dimension of the channel. The openings 76 may be cut before the end of the metal plate from which the bracket is formed is bent to form the channel, in which case the slots would be arcuate as seen in the plate prior to bending, or they may be cut after the end of the plate has been bent. The inclination of the slots to the longitudinal dimension of the channel ensures that the end link 80 is substantially aligned with the other links of the crosslink when the tire chain is mounted and thereby reduces or eliminates bending stress that would otherwise be applied to the end link. In addition, as shown in FIGS. 5 and 6, the curved end of the attachment bracket that is bent to define the channel that receives the bolt 60 is not parallel to the flat part of the bracket but is bent towards the flat part of the bracket in order to restrict movement of the bolt relative to the bracket.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A tire chain comprising:
    a side member,
    an attachment bracket having a first end region secured to the side member and also having an opposite second end region, the attachment bracket including, in the second end region, a channel defined by a bend in a metal plate, oriented parallel with the side member, and a slot intersecting the channel and oriented away from the side member,
    a crosslink member having a first endless link at one end thereof, the endless link defining an opening, a portion of the first endless link being located in the slot so that a part of the opening is within the channel,
    a rod extending along and through the channel and through the opening of the first endless link and being secured against removal from the channel, whereby the crosslink member is secured to the attachment bracket, and wherein
    the attachment bracket includes a flat intermediate part between the first end region and the opposite second end region, and the second end region includes a portion that is bent toward the flat intermediate part so as to restrict movement of the rod relative to the attachment bracket.

2. A tire chain according to claim 1, wherein the rod comprises a bolt and the bolt is secured against removal from the channel by a nut in threaded engagement with the bolt.

3. A tire chain according to claim 1, wherein the crosslink member comprises a length of link chain.

4. A tire chain according to claim 3, wherein the length of link chain includes a second endless link at an end thereof opposite said first endless link, the first and second endless links each defining a respective opening, and wherein the tire chain comprises a second side member and a second attachment bracket having a respective first end region secured to the second side member and also having a respective opposite second end region, and wherein the second attachment bracket includes, in the second end region thereof, a channel defined by a bend in a metal plate, oriented parallel with the second side member and a slot intersecting the channel and oriented away from the second side member, and wherein respective portions of the first and second endless links are located respectively in the slots of the first and second attachment brackets so that respective parts of the openings thereof are within the respective channels, and wherein a second rod extends along and through the channel of the second bracket and through the opening of the second endless link and is secured against removal from the channel of the second end region of the second attachment bracket, whereby the crosslink member is secured to the second attachment bracket.

5. The tire chain of claim 1 wherein said slot is inclined at a non-perpendicular angle with respect to a longitudinal dimension of the channel.

6. The tire chain of claim 5, the second end region of the attachment bracket also including a second slot inclined at an opposite non-perpendicular angle with respect to the longitudinal dimension of the channel.

\* \* \* \* \*